J. J. CARNEY.
SELF LUBRICATING AXLE.
APPLICATION FILED JULY 26, 1915.

1,244,029.

Patented Oct. 23, 1917.

Witnesses

Inventor
J. J. Carney
By
Attorneys

UNITED STATES PATENT OFFICE.

JAMES J. CARNEY, OF BETHEL, VERMONT.

SELF-LUBRICATING AXLE.

1,244,029.  Specification of Letters Patent.  Patented Oct. 23, 1917.

Application filed July 26, 1915. Serial No. 42,043.

*To all whom it may concern:*

Be it known that I, JAMES J. CARNEY, a citizen of the United States, and resident of Bethel, in the State of Vermont and United States of America, have invented certain new and useful Improvements in Self-Lubricating Axles, of which the following is a full, clear, and exact description.

This invention relates to improvements in self lubricating axles for vehicles, and the object of the invention is to provide a simple and efficient means for lubricating an axle without the necessity of removing the wheel therefrom.

A further object is to provide means for retaining a comparatively large amount of lubricant in the axle and distributing the same over a considerable area of the bearing surface.

The device consists essentially of an axle having the bearing portion thereof terminating at one end in a shoulder and at the opposite end in a threaded portion, for the reception of a nut. A plurality of grooves or channels are formed in the bearing surface of the axle starting at the shoulder and converging toward a point near the threaded portion, where they unite to form a single channel which is extended through the threaded portion of the axle.

In the drawings which illustrate the invention:—

Figure 1 is a side elevation of an axle partly in section.

Fig. 2 is a plan view of same.

Figure 1:
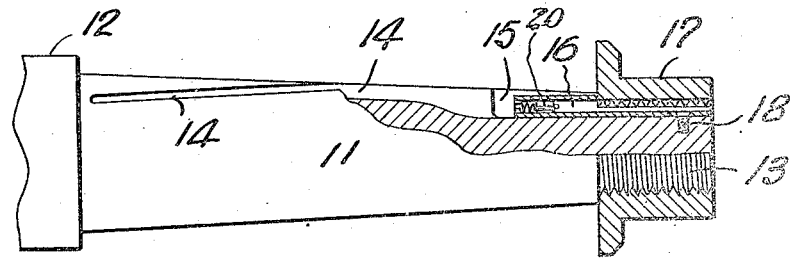

Referring more particularly to the drawings, 11 designates the bearing portion of an axle having at one end thereof a shoulder 12 and at the opposite end a threaded portion 13. A plurality of channels 14 are formed in the bearing surface of the axle, starting at the shoulder 12 and converging toward a point adjacent the threaded portion 13, where they unite to form a single deeper channel 15, which is continued through the threaded portion of the axle in such a manner as to intersect the threads of this portion, or otherwise, if desired. A tube 16 is seated in the channel 15 and is cut away in the upper portion sufficiently to clear the threads of a nut 17 screwed on to the axle. This tube is held in place by a screw or rivet 18, passing into the threaded portion of the axle.

Figure 4:
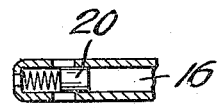
Fig. 4 shows the device equipped with a valve to prevent return flow of the lubricant.

In Fig. 4, a spring pressed valve 20 is shown mounted in the end of the tube for the purpose of preventing reflow of the lubricant through the tube.

Figure 2:
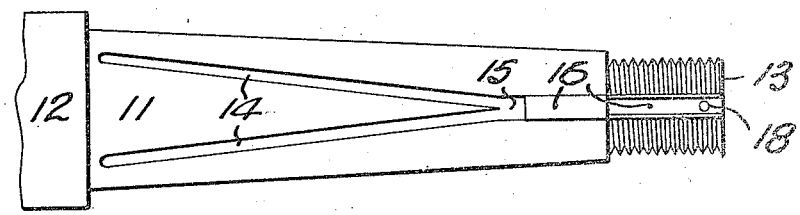
Figure 3:
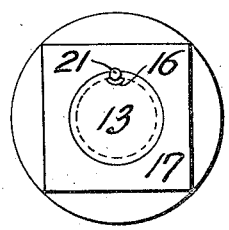
Fig. 3 is an end elevation.

When the tube is arranged as shown in Figs. 1, 2 and 3, it will be necessary to form a slight cut or channel 21 transversely of the threads of the nut, so that when the same is screwed into place, this channel will coincide with the tube and form a complete circular passage for the introduction of the nozzle of a grease gun, by means of which a lubricant can be injected to completely fill the grooves.

It will be readily seen that the provision of a plurality of grooves enables a large amount of lubricant to be inserted in the axle at a time, and also provides for a more certain and more uniform distribution of the lubricant on the bearing surface. It is obvious that while only two grooves have been shown, the number may be increased as required, and the inclination of the grooves varied as necessary to produce the best distribution of the lubricant.

Having thus described my invention, what I claim is:—

1. In a device of the character described, an axle having the bearing surface thereof terminating in a threaded portion, said axle having a longitudinal channel extending through the threaded portion of the axle, and a tube located in the portion of the channel extending through the threaded part of the axle.

2. In a device of the character described, an axle having the bearing surface thereof terminating at one end in a shoulder and at the opposite end in a threaded portion, a plurality of channels formed in the bearing portion of said axle converging from the shoulder to a point adjacent the threaded portion, a single channel deeper than the converging channels communicating therewith and extending through the threaded portion of the axle, a nut on the threaded portion, a tube inserted in said last mentioned channel and reduced by cutting away to clear the threads of said nut, and a channel formed in the nut transversely of the threads thereof, positioned to form with the reduced portion of the tube an orifice for the introduction of a grease gun.

In witness whereof, I have hereunto set my hand, in presence of two witnesses.

JAMES J. CARNEY.

Witnesses:
 GUY WILSON,
 PAUL F. WILSON.

Copies of this patent may be obtained for five cents each, by addressing the "Commissioner of Patents, Washington, D. C."